(12) United States Patent
Johnson

(10) Patent No.: US 9,119,499 B2
(45) Date of Patent: Sep. 1, 2015

(54) UNIVERSAL RAMEN COOKING CONTAINER

(76) Inventor: Christopher Johnson, Wilton, CA (US)

(*) Notice: Subject to any disclaimer, the term of this patent is extended or adjusted under 35 U.S.C. 154(b) by 0 days.

(21) Appl. No.: 13/553,723

(22) Filed: Jul. 19, 2012

(65) Prior Publication Data

US 2014/0178540 A1 Jun. 26, 2014

(51) Int. Cl.
*A23L 1/01* (2006.01)
*A47J 27/00* (2006.01)
*A47J 27/022* (2006.01)

(52) U.S. Cl.
CPC .............. *A47J 27/002* (2013.01); *A23L 1/0128* (2013.01); *A47J 27/022* (2013.01)

(58) Field of Classification Search
CPC ........... A23L 3/04; A23L 1/0128; A23L 1/16; A23L 1/162; A47J 27/002; A47J 27/022
USPC ................ 426/243, 392, 397, 412, 413, 402; 73/426, 427
See application file for complete search history.

(56) References Cited

PUBLICATIONS

Angela mommy bytes: Ramen Noodle Bowl—Something I Can Actually Cook (http://www.mommybytes.com/2010/02/ramen-noodle-bowl-something-i-can.html#.VCme_vldUoo). Feb. 2010.*
Ramen is square, Bowls are round (http://www.democraticunderground.com/discuss/duboard.php?az=view_all &address=105x9658933) Apr. 2011.*
http://www.diapers.com/p/ziploc-container-large-rectangle-51212 Jan. 2011.*
Amazon.com: Cool Touch Microwave Bowl With Unique Handle [Electronic] webpage Feb. 2011.*

* cited by examiner

*Primary Examiner* — Rena L Dye
*Assistant Examiner* — Lela S Williams
(74) *Attorney, Agent, or Firm* — Heisler & Associates

(57) ABSTRACT

The invention provides a container for cooking ramen style block noodles, the container comprising a main body having a generally rectangular base, two generally parallel and spaced side walls connected to the base and two generally parallel and spaced end walls connected to the base and to the side walls, the tops of the side walls and the end walls forming an upper rim. The container is dimensioned so that between about 7 and about 9 ounces of water will fill a container holding a typical 3 ounce mass of ramen style block noodle to a level equal to the top of the noodle mass.

17 Claims, 4 Drawing Sheets

UNIVERSAL RAMEN COOKING CONTAINER

BACKGROUND OF THE INVENTION

1. Field of the Invention

The present invention relates to cooking containers, particularly, containers adapted to cooking a particular style of instant noodle.

2. Description of Related Art

A popular style of quick cooking noodles are sold as blocks of dried noodles. In the U.S. the most common type of instant noodle product is marketed variously as Japanese style noodles, or "ramen" or "ramen-style" noodles, named after the Japanese dish of the same name, and on which the product is generally based.

The noodles themselves are often flavored, commonly using meat-based flavors, such as chicken, pork and beef. Other common flavorings include mushroom, shrimp, roast beef, roast chicken, chili, chili lime, vegetable, and "oriental" (flavored with soy sauce or some similar flavoring agent).

In the United States, this style of instant noodles were introduced by Nissin Foods in 1971 and were initially marketed as "Oodles of Noodles." In 1972, Nissin Foods introduced "Nissin Cup Noodles" in a pre-packaged heat-resistant foam cups, which led to an upsurge in popularity of instant noodles. Competing products by other companies were soon available. Today, however, the most popular version of dried noodles are the block style noodles sold by Nissin Foods in the United States and marketed as Top Ramen®. Nissin enjoys net sales of over $3.2 billion per year.

The most commonly marketed versions of such ramen noodle products is sold as a rectangular block of dry pressed noodles, which cook quickly in boiling water to a mass of soft thin noodles. These ramen-style noodle products are typically packaged with additions, such as a packets of flavoring, dried vegetables, seasoning oil, and the like.

This form of ramen noodles is extremely popular among students and other people of low income, due to the unusually low cost (a six-pack of instant noodles can often be found for less than US$1), and ease of preparation. The noodles are particularly popular with children, students and young adults. They provide and a quick and satisfying meal that is relatively simple in preparation.

The three major brands of instant ramen noodles are Nissin® Top Ramen®, Maruchan® Ramen, and Sapporo Ichiban®. Other brands with similar block style noodles are sold, for instance Shirakiku Brand® Japanese Style Noodle, from Japan, and Crying Tiger™ Ramen Noodle Soup, imported from China.

Maruchan Inc. is a well-known American producer of ramen noodles and related products. Maruchan Inc. produces over 3.6 billion packages of Ramen Noodle Soup a year and now has three manufacturing plants, two in Irvine, Calif. and one in Richmond, Va.

Sapporo Ichiban is a brand of instant noodles (most of them ramen) made by Sanyo Foods, and rivals to other Japanese ramen brands like Nissin and Maruchan.

Certain forms of precooked noodles can be rehydrated by adding boiling water to a provided package. In U.S. Pat. No. 4,803,088, a container packed with instant food for use in microwave oven is provided, having a container body pre-packaged with noodles to be prepared, and a lid. In this product, the noodles and container are sold together, and the container is disposable after a single use. Similarly United States Application 2003/0068411 provides a packaged noodle product adapted to be cooked in its own bowl.

In U.S. Pat. No. 6,217,918, a microwavable pasta product is presented packaged in a special bowl, and with claims directed to the composition of the pasta, a composition allowing the production of the noodles in the microwave without clumping or sticking together.

The block forms of the dried noodles are usually eaten after being simmered in boiling water for anything from 3 up to about 6 minutes, and then transferred to a serving container. After adding the time required to prepare the boiling water, the noodles are not truly "instant". On a typical stove top it requires at least about 6 minutes to prepare the boiling water. Adding this to the time to cook the noodles, and a total of 12 or minutes minutes may be necessary to prepare a package for eating.

For a busy student or hungry child this can seem a long time, longer than necessary to prepare, say, a peanut butter sandwich. Further, for a very young person, the preparation can be fraught with dangers associated with the use of the stove top, requiring both the preparation of boiling water and transfer of liquids between containers, which increases the chances of spills and accidental burnings.

Microwave instructions are not typically included in the instructions on a noodle packet. When attempting to accelerate the process in a microwave, the square noodle package will not fit in the typical circular serving bowl, such as a cereal bowl. Any such attempt creates a mess as the consumer the noodles must be broken to fit into the circular bowl.

Other microwave cooking suggestions for pasta are not easily adapted for ramen style block noodles. In United States Patent Application 2010/0263552 and U.S. Design Pat. No. 638,701, elaborate constructions are provided for microwave noodle cooking containers that utilize lids that act as colanders, or provide internal colanders to allow cooking of pasta in a volume of water and then easy draining of the product.

Other inventions highlight the problems of getting even cooking of the noodles in the microwave. U.S. Pat. No. 7,067,780, provides a container for cooking pasta in a microwave oven that has a compartment to contain the pasta cooking water and a stirrer for moving the pasta during cooking.

Many of these noodle products and container designs highlight the difficulty of retrieving hot cooked noodles out of the microwave, as the heating of the microwave can produce superheated water, and hence it can be a dangerous task. They also attempt to solve the problem of moving the pasta within the container so that the water heated by the microwave will evenly cook all noodles, and not have portions that are uncooked or clumped together.

However, none of the pasta microwave cooking containers seem well adapted to the quick-cooking small and soft ramen style noodles.

SUMMARY OF THE INVENTION

These and other features and advantages of this invention are described in, or are apparent from, the following detailed description of various exemplary embodiments of the apparatus and methods according to this invention.

The invention provides a container for cooking ramen style block noodles, the container comprising a main body having a generally rectangular base, two generally parallel and spaced side walls connected to the base and two generally parallel and spaced end walls connected to the base and to the side walls, the tops of the side walls and the end walls forming an upper rim. The container is dimensioned so that between about 7 and about 9 ounces of water will fill a container holding a typical 3 ounce mass of ramen style block noodle to a level approximately equal to the top of the noodle mass.

Common ramen style block noodles that are suited for use in the container include Nissin Top Ramen, Maruchan Ramen, and Sapporo Ichiban Japanese style noodles.

The ramen style block noodle mass typically occupies about 2 ounces, thus an indicator, such as a water line drawn parallel to the base, can be include that marks the level equivalent to about 9 to 11 ounces of water in an empty container.

In a preferred such container, only about 7.5 ounces and 8.5 ounces of water is sufficient, most preferably only about 8 ounces of water, to fill the container to the top of the ramen style block noodle.

In a preferred aspect of the container, side walls are spaced between about 4 inches and about 4.75 inches at the base, more preferably between about 4.25 inches and 4.5 inches.

In another preferred aspect of the container, end walls are spaced between about 5 and about 5.75 inches at the base, more preferably between about 5.25 and about 5.5 inches.

Preferably, the rim is between about 2 inches and about 2.5 inches from the base.

In a preferred embodiment of the container, the end walls and the side walls are tapered so as to be spaced about 0.25 inches greater at the rim than at the base.

In one preferred aspect, the main body is produced of heat-resistant plastic, such as a polyethylene, polycarbonate or polypropylene. In such an aspect, the main body may be injection molded or stamped.

In another preferred aspect, the main body is produced of a microwave safe glass, such as a tempered glass.

In a different preferred aspect, the main body is produced of a microwave safe ceramic.

The container of the invention makes possible a simple method for cooking ramen style block noodles, the method comprising the steps of; a) placing a dry ramen style block noodle into a container comprising a main body having a generally rectangular base, two generally parallel and spaced side walls connected to the base and two generally parallel and spaced end walls connected to the base and to the side walls, b) adding between about 7 ounces and about 9 ounces of water to the container; and c) placing the container in a microwave oven and cooking on a high setting for a time sufficient to bring the water to a full boil across the entire surface of the ramen style block noodle for at least about 90 seconds.

Because the volume used for the container is so low, cooking times are concluded after a microwave time on high of about 6 minutes or less, more preferably for about 5 minutes or less, and most preferably in about 4 minutes or less.

These and other features and advantages of this invention are described in, or are apparent from, the following detailed description of various exemplary embodiments of the apparatus and methods according to this invention.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF THE INVENTION

The present invention relates to a rectangular cooking container for producing cooked "ramen style" instant noodles in the microwave oven. As will be seen from the discussion below, the cooking container serves as a universal cooking container for the most common varieties of ramen-style noodles. The ramen style microwave cooking container is shaped with dimensions that accommodate and closely approximate the dimensions of the most commonly marketed ramen style block noodles.

For purposes of this description, the term "ramen style block noodle" shall refer to any of the numerous noodle products that are produced as dried blocks of compressed noodles, and packaged in that state for home preparation. Ramen style block noodles are typically prepared by simmering the block in boiling water until the noodles soften and can be easily separated, by stirring with a fork or the like.

Figure 1:
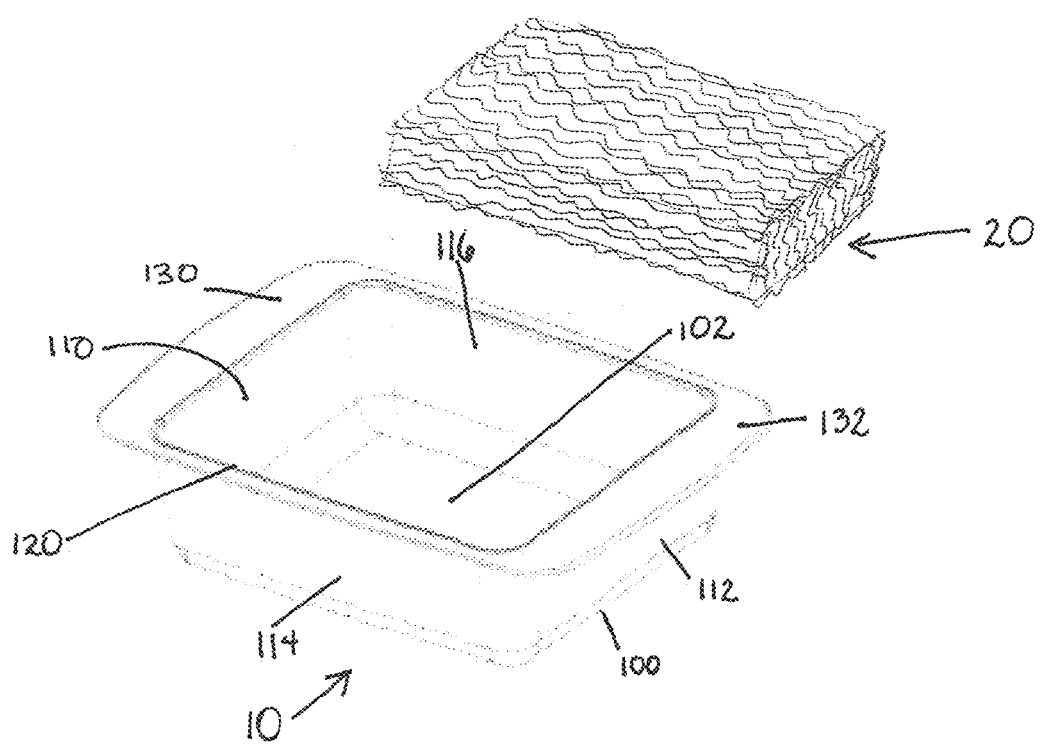
FIG. 1 is a perspective view of the container of the invention and a dry mass of ramen style block noodles.

In reference now to the Figures, and particularly FIG. 1, the container 10 is shown, in relation to the pressed block 20 of a ramen style block noodle ready to be placed in the container 10.

The container 10 comprises a main body 100 that is generally rectangular, with a base 102 and two generally parallel and spaced end walls 110 an 112 connected to the base and two generally parallel and spaced side walls 114 and 116 connected to the base and to the end walls 110 and 112. The tops of the side walls 114 and 116 and the end walls 110 and 112 collectively form an upper rim 120.

The container 10 may be produced of heat-resistant plastic, such as a polyethylene, polycarbonate or polypropylene, or a microwave safe glass, such as a tempered glass. Numerous microwave safe ceramics are also known to the art which would be suitable.

Figure 2:
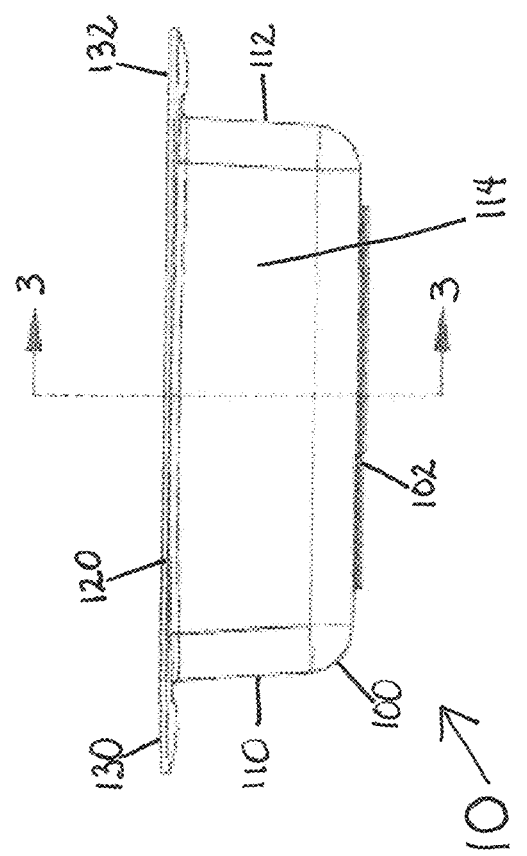
FIG. 2 is a side view of the container of FIG. 1, with lines depicting the cross section view of FIG. 3.
Figure 3:
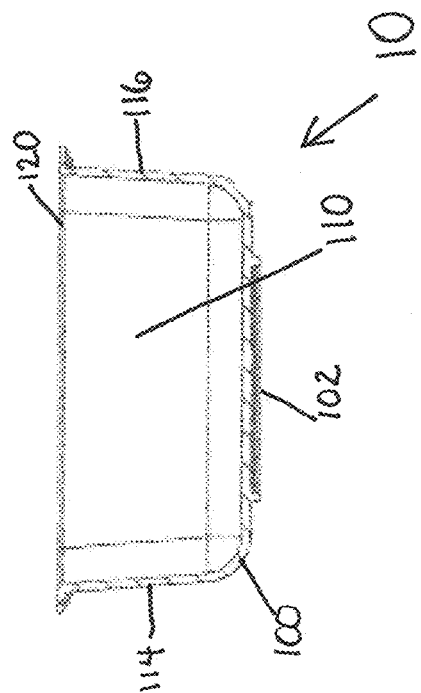
FIG. 3 is a cross section end view of the container taken along line 3-3 of FIG. 2.

Looking to the side view provided by FIG. 2, it is seen that the container includes heat resistant handles 130 and 132 at each end wall 110 and 112, for lifting and removing a hot container out of the microwave. The heat resistant handles 130 and 132 may be the same thickness and material as the container walls. They should extend at least 1 centimeter, even better about ½ inch, up to about 1 inch or more from the end walls 110 and 112, providing a location for a sufficient finger grip for easy handling of the container 10, particularly for removal from the microwave after cooking. For a stamped or molded plastic container, the handles 130 and 132 may be produced as one piece with the container body 10.

Looking more generally to FIGS. 2 through 5, the container 10 is rectangular approximating the rectangular dimension commonly used in ramen style block noodles 20. Side walls 114 and 116 are spaced between about 4.25 inches and about 4.75 inches at the base, and ideally about 4.5 inches. End walls 114 and 116 are spaced between about 5 and about 5.5 inches at the base, and ideally about 5.25 inches.

Figure 4:
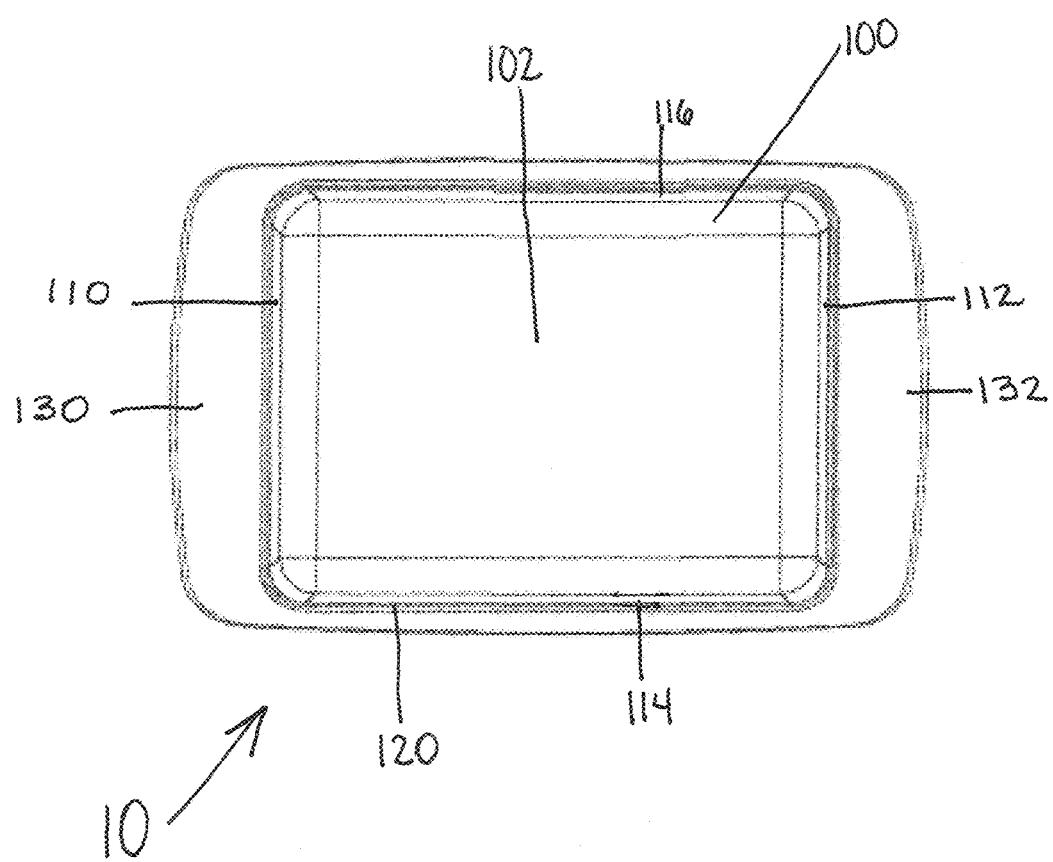
FIG. 4 is a top view of the container of FIG. 1, showing the tapered side and end walls.

As seen best in reference to FIG. 4, the end walls 110 and 112 and the side walls 114 and 116 may be tapered so as to be spaced slightly more at the rim than at the base. This allows easy placement of the noodles into the body of the container 10 and onto the base 102. The taper may be from as little as a tenth to as much as a quarter of an inch may be deemed suitable for various container embodiments.

Figure 5:
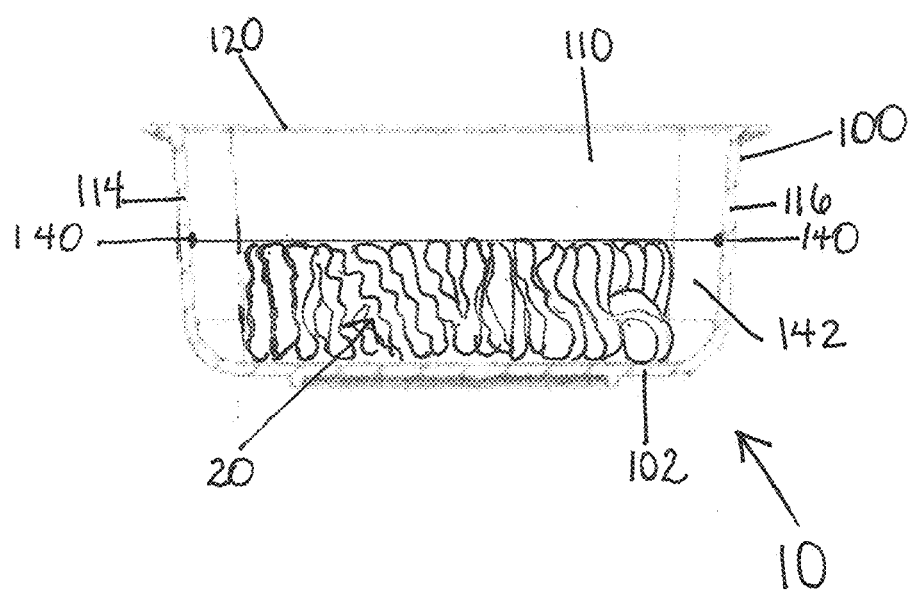
FIG. 5 is a view as shown in FIG. 3, only depicting a mass of ramen style block noodles, a water line and water.

In reference to FIG. 5, a container 10 similar to the container of FIGS. 1 through 4 is shown, only having an indicator, in this case a water line 140, along the side walls, for ease of measurement of the correct amount of water 142. The container 10 is optimized for cooking ramen style block noodles 20, by placing the dry ramen style block noodle 20 into the container 10, adding between about 7 ounces and about 9 ounces of water 142 to the container, up to the water line 140, and placing the container 10 in a microwave oven and cooking on a high setting for a time sufficient to bring the water to a full boil across the entire surface of the ramen style block noodle for at least about 90 seconds.

The container 10 is dimensioned so that between about 7 and about 9 ounces of water 142 will fill a container 10 holding a typical 3 ounce mass of ramen style block noodle 20. The water line 140 also marks a level equal to the top of the noodle mass. The ramen style block noodle 20 typically occupies about 2 ounces, thus an indicator, such as a water line 142 drawn parallel to the base, will typically mark about 9 and 11 ounces of water added to an empty container.

For typical ramen style block noodle products, a volume of only about 7.5 ounces and 8.5 ounces or water will be required, ideally about 8 ounces, to fill the container to the top of the ramen style block noodle 20. The low volume of water 142 is important. Even in a low wattage microwave oven, the 90 second full boil over the surface can be concluded in less than about 6 minutes. With stronger ovens the requisite cooking is completed in 5 minutes or less, or even 4 minutes or less.

The container 10 serves as a universal cooking container for a variety of ramen style block noodles. In the United State, Nissin Top Ramen is sold as 3 ounce dry noodles packaged with varying flavoring components. The noodles are produced as a 1 inch high blocks, in a rectangle measuring 4 inches long by 3 and ½ inches wide.

Maruchan Ramen Noodle Soup is marketed in the United States as blocks of noodles packaged with varying flavoring components. The noodles are similarly 3 ounces, packaged as a 1 inch high block in a rectangle 4 inches long by 3 and ¾ inches wide.

Sapporo Ichiban's Japanense Style Noodles are marketed in the United States in a 3.5 ounce block of noodles measuring 1 inch high by 4½ inches long by 4 inches wide.

Two other brands of ramen style noodles were also considered, providing slightly greater and smaller dimensions than the top three products. A block of Crying Tiger Ramen Noodle Soup weighs 3 ounces, but has a slightly smaller external dimension, measuring 3½ inch by 3½ inch by 1 inch. The Shirakiku noodle block weighs only 2.89 ounces, but has the greatest external block dimensions of the five ramen style block noodles considered, with a length of 4½ inches and a width, of 4⅛ inches, while still standing 1 inch high.

The dimensions of the ramen style block noodles, including the three most commonly sold in the United States, are summarized below in Table 1.

TABLE 1

| Product | Height* | Width* | Length* | Ounces |
| --- | --- | --- | --- | --- |
| Shirakiku Noodle | 1 | 4⅛ | 4½ | 2.89 |
| Sapporo Ichiban | 1 | 4 | 4½ | 3.5 |
| Maruchan Ramen | 1 | 3⅝ | 4 | 3 |
| Nissin Top Ramen | 1 | 3½ | 4 | 3 |
| Crying Tiger | 1 | 3½ | 3½ | 3 |

*in inches

In view of these popular brands of ramen style noodles, a universal microwave cooking container that could accommodate each of these would accommodate dimensions that ranged in length from 3½ inches (Crying Tiger) to 4½ inches (Shirakiku and Sapporo), and widths from 3½ inches (Crying Tiger and Nissin) to 4⅛ inches (Shirakiku).

Each block, however, is 1 inch high, such that a water mark at or around 1 inch would work with each product.

While any container larger than the Sapporo Ichiban would theoretically suffice, a further operating principal of the container, however is to utilize the minimum amount of water as is absolutely necessary, so as to not delay the cooking of the noodles by the time spent in heating an excess of water. Cooking time is largely dependent on the volume and starting temperature of the water, as well as the microwave power. By containing the water to as small a volume as possible, the cooking time to produce cooked and ready to eat noodles is directly reduced, saving time and energy.

Further, when greater volumes are used, the time the noodles are in contact with under-heated water is increased. This is not desired, as the longer the noodles are maintained in less than boiling water, the soggier they become. For each product described herein, the instructions direct the prepare to first bring the water to boil, and only than add the ramen style noodle block to the already boiling water.

Additionally, in a larger container the noodles will be cooked inconsistently across the block, for the reason of the heating inherent to a microwave. Microwaves penetrate ends and corners of a larger container first, heating material at those locations at a higher rate. If the cooking area were expanded, noodles in the middle of the block would remain relatively uncooked even as the noodles at the edges of the block. Further, the noodles themselves serve to block and prevent heated water from circulating in the cooking container, which would otherwise disperse the heat throughout the cooking bowl. In a container holding larger volumes of water, then, the noodles will not be uniformly heated, resulting in inconsistent noodle cooking across the block.

For all these reasons, the universal container 10 will not greatly exceed the dimensions of the largest block contemplated. In developing the container, various existing container types, of various sizes, were evaluated, with the volumes of water necessary to cook a block of noodles calculated, and the time needed to cook. From these experiments, the dimensions of a universal noodle bowl were determined. The dimensions of the universal ramen cooking container guarantee quick and consistent noodle cooking from any of the most common types of pressed ramen style block noodles. Based on the above considerations, a polypropylene plastic container was produced with the following measurements, as detailed in Table 2:

TABLE 2

| Length | 5¼ inches |
| --- | --- |
| Width | 4½ inches |
| Depth | 2 inches |
| Water line | 1 inch (from base) |
| Handles | 1 inch (at ends) |
| Thickness | 0.1 inch |

The container is used to cook the ramen style block noodles with no lid or other covering. A depth of 2 inches was chosen so that the container would require no cooking lid to contain the liquid during cooking Heating a small volume of water at high temperatures in a microwave can produce superheated and rapidly boiling water. The use of a lid presents problems in these circumstances, as the lid will itself become superheated from the steam rising from the cooking liquid. No lid means one less potential place where the preparer could be burned.

Further a lid serves to retain heat and contributes to boil over. Many ramen cup noodle products are produced with a lid that is retained during cooking, to retain heat and steam within the cup. Because of the small volume of water being heated in the container, however, heat dissipation is not a concern. Sufficient heating and cooking of the noodles is accomplished by the container in such a short time, that there is no need to retain the heat in the steam generated by the operation.

The container was injected molded, and produced with a thickness of 0.1 inch, sufficient to provide some heat resistance, particularly over the anticipated quick cooking times. The thickness was also sufficient to prevent warping over the high superheated water temperatures anticipated by the microwave cooking process with a sustained boiling period of 2 minutes or so. Greater thicknesses could be incorporated into the design, to enhance durability and/or heat resistance, for example.

Based on the above dimensions, a water line located 1 inch from the base of the container will mark the addition of 10 ounces of water to an empty container. When an approximately 3 ounce block of noodles is occupying the container, however, less water is required to fill the container to the water line. Table 2 shows the ounces of water required to fill the bowl up to the fill line, for a container holding each of the given ramen style block noodles:

TABLE 3

| Noodle | Ounces |
| --- | --- |
| Shirakiku Japanese Style Noodle | 8 |
| Sapporo Ichiban | 7.5 |
| Maruchan Ramen | 8 |
| Nissin Top Ramen | 8 |
| Crying Tiger Ramen Noodle Soup | 8 |

The Sapporo Ichiban block, at 3.5 ounces, is heavier than any of the other noodle blocks, and occupies a greater volume.

The container thus only heats the amount of water necessary to reach the top level of the noodles, a depth of 1 inch, and in each case the volume of water heated comprises 8 ounces or less. Because the noodles float slightly, filling to the water line may not appear to top up, or "cover over" the noodles completely with water. Due to the open structure of a the dry noodle product, however, water will occupy internal spaces, which is also important for the rapid cooking in the microwave using the container.

Microwaves typically only penetrate food about 1½ inches. For cooking a block of noodles in water, the measurement would be from the edge of the water. For a cooking container of the above dimensions, the microwave radiation will have not problem reaching the center of the container from the top, and from the edges, will penetrate to all but the middle 1½ inches of the container. All but 2¼ inches of the container center will be reached from the opposite ends.

Where multiple microwave coverage occurs, the water can be expected to heat more than where it is only penetrated from one direction. The dimensions and tight spacing of the cooking container evens out the microwave energy, such that heated water is present in close contact with the entirety of the noodle product after only a relatively short cooking time. The container depth of 2 inches was sufficient to contain the heated water from overflowing the container, even at the ends or corners.

A container of these dimensions has been shown to provide the precise heat distribution to create evenly cooked noodles by microwave radiation in as little as 4 minutes.

While the ease of use and reduced time to completion are one advantage, safety is another advantage of the container, as the conventional stovetop operation of heating the water is less safe, particularly for inexperienced cooks. Using the universal container, all of the steps of noodle preparation are simple and relatively safe, and cooking the noodles in one container reduces the time and opportunity for spilled or splashed boiling water.

EXAMPLES

Various noodle preparations were made, both with conventional methods, and by using the container.

Example 1

Package Directions on Stove Top

A block of Nissin Top Ramen was prepared according to the package directions. Two cups of tap water at approximately 65 degrees F. were added to a small (six inch) saucepan and placed on the stove top.

The pan was placed on a gas stovetop and heated to boiling over a high flame. After approximately 5 minutes the water was heated to boiling, as required by the directions.

A block of noodles was added to the boiling water and cooking was continued over the same high flame for three minutes, as directed.

After about 1 minute, the rapid boiling was reestablished.

After three minutes, the noodles were removed from the heat and observed. Overall, the noodles had maintained the block formation of the packaged dry form of the noodles.

The noodle block was broken up with vigorous stirring and it was observed that noodles from the center of the block had a white, uncooked appearance, and were somewhat rigid compared to the more opaque noodles seen at the margins of the block.

After setting for 30 seconds, the seasoning packet was stirred in. The noodles were ready for eating approximately 9 minutes from the start of cooking.

Example 2

Modified Stove Top

A block of Nissin Top Ramen, as in Example 1, was prepared according to the package directions, only modified by stirring.

Two cups of tap water were heated to boiling as in Example 1.

The block of noodles was added to the boiling water and cooking was continued over the same high flame for 3 minutes. Based on the Example 1 observation that the noodles cooked unevenly if left undisturbed in the pan, after a minute, the noodle block was broken up by vigorous stirring.

After 3 minutes, the noodles were removed from the heat and observed. The noodles were substantially opaque, although a few noodles were observed that had the white, rigid appearance of the uncooked noodles. The noodles were allowed to sit 1 minute to allow the uncooked portions to turn opaque.

The seasoning was stirred in and the noodles were ready for eating 8 minutes and 30 seconds from the start of cooking.

Example 3

Microwave Safe Glass Container

A block of Nissin Top Ramen as per Examples 1 and 2 was prepared in a commercially available rectangular tempered glass bowl. The bowl internal dimensions were 8 inches by 6½ inches, and the bowl had a depth of 2 inches.

Two cups of tap water of approximately 65 degrees F. were required until the water level was essentially even with the top of the noodle block.

Gaps between the bowl and the noodle block were observed of 2 inches at either end, and 1½ inches at the sides.

The container was placed in a microwave and cooked at the highest setting for 5 minutes. The microwave was a 1.3 cubic foot capacity, 1000 watt General Electric Co., Countertop Microwave Oven, Serial Number JES1344SK.

During this cooking period, at no time did the water appear to boil over the center of the block of noodles. After about 3 minutes, however, vigorous boiling water was observed at the corners of the bowl.

After 5 minutes the block was removed from the microwave and observed visually for evidence of cooked and uncooked noodles. The center of the block had a surface that was substantially white, as opposed to the opaque appearance of cooked noodles at the edges, indicating a substantial portion of the block being still raw.

The container was returned to the microwave for another two minutes, during which time water at the edges and corners continued to boil vigorously, while no surface boiling was observed at any time over the center of the block of noodles.

After the additional minutes, white noodles were still observed over the center of the block. At this point, the noodles were stirred and returned for another three minutes in the microwave.

After the final additional minutes, the noodles were removed and observed again. Some portion of the noodles remained only partially cooked. The noodles were allowed to sit 1 minute to allow the uncooked portions to turn opaque.

The seasoning packet was stirred in and the noodles were ready to eat 11 minutes from the start of cooking, although the noodles were not uniformly cooked.

Example 4

Microwave Cooking Container

A block of Nissin Top Ramen, as in Examples 1 through 3, was prepared in the microwave as described in Example 3, only using the container described in Table 2.

Tap water of approximately 65 degrees F. was added to the container to the water line, and was essentially even with the top of the noodle block. This required 1 cup (8 ounces) of water.

Gaps between the noodles and the container edges were observed to be ⅝ inch at either end, and ½ inch at the sides.

The container was placed in a microwave and cooked at the highest setting for 4 minutes. After about 2 minutes, boiling water was observed across the entire surface of the noodle block, with no appreciable excess at the corners of the container.

After about 2½ minutes foaming was observed across the entire surface of the block. From 3 minutes to completion of cooking at 4 minutes, substantial and vigorous boiling was observed across the entire container, to the extent that only foam could be seen.

After 4 minutes, the container was removed from the microwave and observed visually for evidence of cooked and uncooked noodles. The entire noodle surface had the opaque appearance of cooked noodles.

The flavoring packet was stirred in and thoroughly cooked ramen style noodles were ready for eating only 4 minutes from the start of cooking.

Example 5

A block of Maruchan Ramen Noodles was prepared in the container described in Example 4 for the Nissin Top Ramen.

Tap water of 65 degrees F. was added until the water level was even with the top of the noodle block. This required 1 cup (8 ounces) of water.

Gaps between the noodles and the container edges were observed to be ⅝ inch at either end, and 3/16 inch at the sides.

The container was placed in a microwave and cooked as in Example 4. As was the case in Example 4, after about 2 minutes, boiling water was observed across the entire surface of the noodle block, with no appreciable excess at the corners of the container.

After about 2½ minutes foaming was observed across the entire surface of the block. From 3 minutes to completion of cooking at 4 minutes, substantial and vigorous boiling occurred across the entire surface, such that the noodles were not visible.

After 4 minutes, the container was removed from the microwave and observed visually for evidence of cooked and uncooked noodles. The entire noodle surface had the opaque appearance of cooked noodles.

The flavoring packet was stirred in and thoroughly cooked ramen style noodles were ready for eating only 4 minutes from the start of cooking.

Example 6

A block of Sapporo Ichiban Noodles was prepared as for the noodles in Examples 4 and 5. A difference was that 7.5 ounces of tap water were required to fill the container to the water line, because of the greater size of the Sapporo Ichiban Noodles. Gaps between the noodles and the container edges were reduced with the larger block. There was very little gap at the sides, of only about ¼ inch, and a gap of ⅜ inch was observed at either end.

The container was placed in a microwave and cooked on high for 4 minutes. After about 2 minutes, boiling water was observed evenly distributed across the entire surface of the noodle block.

After about 2 minutes and 30 seconds, foaming was observed across the block surface. From 3 minutes to completion of cooking at 4 minutes, substantial and vigorous boiling occurred across the entire surface, such that the noodles were not visible.

After 4 minutes, the container was removed from the microwave and observed visually for evidence of cooked and uncooked noodles. The entire noodle surface had the opaque appearance of cooked noodles.

The flavoring packet was stirred in and thoroughly cooked ramen style noodles were ready for eating 4 minutes from the start of cooking.

Example 7

A block of Shirakiku™ Japanese Style Noodles was prepared as for Examples 4, 5 and 6, using 1 cup (8 oz) tap water to the water line.

No appreciable gaps between the noodle edges and the container side walls were present. There was a gap at each end of ⅜ inch.

The container was placed in a microwave and cooked on high for 4 minutes. After about 2 minutes, boiling water was observed across the entire surface of the noodle block, with no appreciable excess at the corners of the container.

After about 2 minutes and 30 seconds, foaming was observed across the entire surface of the block. From 3 minutes to completion of cooking at 4 minutes, substantial and vigorous boiling occurred across the entire surface, such that the noodles were not visible.

After 4 minutes, the container was removed from the microwave and observed visually for evidence of cooked and uncooked noodles. The entire noodle surface had the opaque appearance of cooked noodles.

The flavoring packet was stirred in and thoroughly cooked ramen style noodles were ready for eating only 4 minutes from the start of cooking.

Example 8

A block of Crying Tiger Ramen Noodle Soup was prepared as for Examples 4, through 7, using 1 cup (8 oz) tap water to the water line.

There was a gap at each end of ⅞ inch, and a gap of ½ inch at the sides.

The container was placed in a microwave and cooked on high for 4 minutes. After about 2 minutes, boiling water was observed across the entire surface of the noodle block, with no appreciable excess at the corners of the container.

After 2 minutes and 30 seconds, foaming was observed across the entire surface of the block. From 3 minutes to completion of cooking, boiling occurred across the entire surface, such that the noodles were not visible through the bubbles.

After 4 minutes, the container was removed from the microwave and observed visually for evidence of cooked and uncooked noodles. The entire noodle surface had the opaque appearance of cooked noodles.

The flavoring packet was stirred in and thoroughly cooked ramen style noodles were ready for eating only 4 minutes from the start of cooking.

The methods described above for cooking the noodles use significantly less water than the stovetop methods typically described in the package instructions. While many people enjoy the noodles without as much liquid, if a more diluted finished product is desired, a small amount of hot water can be added at the end of cooking. Alternatively, less of the seasoning packet may be use, which may be preferable for those wishing to reduce sodium intake.

While the container is adapted for use with the most common brands or styles of ramen style block noodles, other versions or sizes of the container could be adapted to optimize the noodle preparation of larger or smaller styles of block noodles. Thus, while the present invention is described with reference to the illustrations for specific applications, it should be understood that the invention is not limited to those applications. Those skilled in the art with access to invention described herein will recognize additional modifications, applications, and embodiments within the scope thereof and additional fields in which the invention would be of significant utility.

What is claimed is:

1. A method for cooking ramen style block noodles, said method comprising the steps of;

a) placing a block of ramen style noodles into a container comprising a main body having a generally rectangular base, two generally parallel and spaced side walls connected to said base and two generally parallel and spaced end walls connected to said base and to said side walls, b) putting water into the container, c) positioning said container in a microwave oven and cooking on a high setting for a time sufficient to bring the water to a full boil across the entire surface of said ramen style block noodle for at least about 90 seconds with the water level high enough to cover the ramen when boiling; and d) wherein said placing step includes the container sized to fit the block of ramen style noodles adjacent to the base with a gap of ⅞ inch or less between a perimeter of the ramen block and the side walls and the end walls.

2. The method of claim 1 wherein said container is microwaved for a period of about 6 minutes or less.

3. The method of claim 2 wherein said container is microwaved for a period of about 5 minutes or less.

4. The method of claim 3 wherein said container is microwaved for a period of about 4 minutes or less.

5. The method of claim 1 wherein said container comprises an indicator marking the addition of water in step b) to a depth of 1 inch.

6. The method of claim 5 wherein said indicator marks the addition of 8 ounces of water to a 3 ounce ramen style block noodle.

7. A method for cooking a block of ramen style noodles, including the steps of:

selecting a container having a generally rectangular base, a pair of side walls extending up from opposite sides of the base, and a pair of end walls extending up from opposite ends of the base;

placing the block of ramen style noodles in the container;

putting water into the container;

positioning the container in a microwave oven;

powering the microwave oven at least until the water boils, and with the putting water step putting sufficient water into the container to provide a water level high enough to cover the ramen when the water is boiling;

eating the cooked ramen style noodles; and wherein said selecting step includes the container sized to fit the block of ramen style noodles adjacent to the base with a gap of ⅞ inch or less between a perimeter of the ramen block and the side walls and the end walls.

8. The method of claim 7 wherein said selecting step includes the pair of side walls and the pair of end walls each extending up to a common upper rim at a common height above the base.

9. The method of claim 8 wherein said selecting step includes handles extending laterally from the upper rim.

10. The method of claim 9 wherein said selecting step includes the handles having a curved upper surface.

11. The method of claim 8 wherein said selecting step includes a common upper rim extending at least somewhat laterally away from upper portions of both the side walls and the end walls.

12. The method of claim 7 wherein said selecting step includes each of the pair of side walls and each of the pair of end walls tapering from the base to upper portions of the pair of side walls and the pair of end walls opposite the base, such that spacing between the pair of side walls is greater at upper portions of the pair of side walls than adjacent the base and spacing between the pair of end walls is greater at upper portions of the end walls than spacing of the pair of end walls adjacent the base.

13. The method of claim 12 wherein a line is provided on at least one of the pair of side walls and the pair of end walls with the line oriented substantially parallel with the base and spaced from the base; and wherein said putting step includes the water filling up the container to about a height of the line.

14. The method of claim 7 wherein said putting step occurs after said placing step and includes the water filling the container up to a height at least as high as an upper surface of the block of ramen style noodles.

15. The method of claim 14 wherein said selecting step includes the container sized so that about one cup of water fills the container up to a height covering a one inch thick block of ramen style noodles.

16. The method of claim 7 wherein said placing step includes placing the block of ramen style noodles upon the base of the container.

17. The method of claim 16 wherein said selecting step includes the base curving up at sides and ends thereof to transition into the pair of side walls and the pair of end walls.

\* \* \* \* \*